(12) United States Patent
Nagaoka et al.

(10) Patent No.: US 6,816,189 B2
(45) Date of Patent: Nov. 9, 2004

(54) ELECTRON CAMERA AND METHOD OF CONTROLLING THE SAME

(75) Inventors: Shiro Nagaoka, Fukaya (JP); Tatsuhiko Ikehata, Fukaya (JP); Kei Tashiro, Kitamoto (JP); Jun Ootsubo, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 789 days.

(21) Appl. No.: 09/796,433

(22) Filed: Mar. 2, 2001

(65) Prior Publication Data

US 2002/0080252 A1 Jun. 27, 2002

(30) Foreign Application Priority Data

Dec. 27, 2000 (JP) .......................................... 2000-399296

(51) Int. Cl.[7] .................................................. H04N 5/76
(52) U.S. Cl. .................................. 348/231.2; 348/231.5
(58) Field of Search ........................... 348/231.2, 231.3, 348/231.5, 231.6

(56) References Cited

U.S. PATENT DOCUMENTS 5,745,902 A * 4/1998 Miller et al. ................. 707/200
6,192,191 B1 * 2/2001 Suga et al. ............... 348/220.1
6,286,013 B1 * 9/2001 Reynolds et al. ........... 707/200
6,473,569 B1 * 10/2002 Shidate et al. .............. 396/280
6,704,047 B1 * 3/2004 Tsutsui ..................... 348/231.2
2002/0051641 A1 * 5/2002 Nagaoka ..................... 396/429
2003/0169349 A1 * 9/2003 Aoi et al. ................. 348/231.2

FOREIGN PATENT DOCUMENTS

JP          10-177646         10/1996
JP          2000-165789       11/1998

* cited by examiner

Primary Examiner—Wendy R. Garber
Assistant Examiner—Jason Whipkey
(74) Attorney, Agent, or Firm—Pillsbury Winthrop LLP (57) ABSTRACT

A list of the selected and input virtual directory names are displayed on the display screen by operating the album key and a predetermined virtual directory name is selected from the list of the virtual directory names being displayed on the display screen by operating any of the movement keys and the determination key. The image data obtained as a result of an imaging operation are recorded in a directory corresponding to the selected virtual directory name and conforming to the DCF Standard.

12 Claims, 12 Drawing Sheets

F I G. 5 vfm FILE DATA STRUCTURE

| STRUCTURE CODE | NAME | MEANING |
|---|---|---|
| 0x1000 | MANAGEMENT CODE | RESERVED |
| 0x1001 | NUMBER OF PARAMETERS | FIXED TO 5 IN VER 0.1 WILL BE INCREASED WHEN EXTENDED AND CODE 0x1000 IS ADDED |
| 0x1002 | MULTIPLE LINK | REFER TO 1 TO 1 FOR 0 REFER TO PLURALITY TO PLURALITY OF FOR 1 |
| 0x1003 | USER NAME | HOLDER (ALBUM) NAME GIVEN APPROPRIATELY BY USER |
| 0x1004 | DATE OF PREPARATION | DATE OF PREPARATION OF HOLDER (ALBUM) |
| 0x1005 | DATE OF MODIFICATION | DATE OF MODIFICATION OF HOLDER (ALBUM) |
| 0x1100 | NUMBER OF BLOCKS | NUMBER OF FILES REGISTERED IN HOLDER (ALBUM) |
|  |  |  |
| 0x1101 | BLOCK NUMBER | STARTING FROM NO.1 AS DEFINED BY 0x1100 |
| 0x1102 | MANAGEMENT CODE | RESERVED (SORTING CODE) |
|  |  |  |

FIG. 6A

| 0x1103 | NUMBER OF PARAMETERS | FIXED TO 7 IN VER 0.1 WILL BE INCREASED WHEN EXTENDED AND CODE 0x1100 IS ADDED |
|---|---|---|
| 0x1104 | REAL HOLDER NAME | HOLDER NAME ON DCF |
| 0x1105 | REAL FILE NAME | FILE NAME ON DCF (EXTENDER NOT REQUIRED) |
| 0x1106 | REAL ADDRESS | OPTIONAL (ADDRESS INFORMATION SUCH AS SERVER) |
| 0x1107 | DATE OF REGISTRATION | DATE OF REGISTRATION OF FILE |
| 0x1108 | DATE OF MODIFICATION | DATE OF MODIFICATION OF FILE |
| 0x1200 | NUMBER OF SUB-BLOCKS | 1 WHEN ONLY IMAGE IS STORED WILL BE INCREASED WHEN SOUND AND CHARACTERS ARE ADDED |
|  |  |  |
| 0x1201 | SUB-BLOCK NUMBER | STARTING FROM NO.1 AS DEFINED BY 0x1200 |
| 0x1202 | MANAGEMENT CODE | RESERVED |
| 0x1203 | NUMBER OF PARAMETERS | FIXED TO 1 IN VER 0.1 WILL BE INCREASED WHEN EXTENDED AND CODE 0x1200 IS ADDED |
| 0x1204 | FILE FORMAT | FILE FORMAT CODE |

FIG. 6B vlm FILE DATA STRUCTURE

| STRUCTURE CODE | NAME | MEANING |
|---|---|---|
| 0x2000 | MANAGEMENT CODE | RESERVED |
| 0x2001 | NUMBER OF PARAMETERS | FIXED TO 5 IN VER 0.1<br>WILL BE INCREASED WHEN EXTENDED AND CODE 0x1000 IS ADDED |
| 0x2002 | MULTIPLE LINK | REFER TO 1 TO 1 FOR 0<br>REFER TO PLURALITY TO PLURALITY OF FOR 1 |
| 0x2003 | DATE OF PREPARATION | DATE OF PREPARATION OF LINK FILE |
| 0x2004 | DATE OF MODIFICATION | DATE OF MODIFICATION OF LINK FILE |
| 0x2100 | NUMBER OF LINKS | NUMBER OF FILES LINKED FOR vfm |
|  |  |  |
| 0x2101 | BLOCK NUMBER | STARTING FROM NO.1 AS DEFINED BY 0x2100 |
| 0x2102 | MANAGEMENT CODE | RESERVED (SORTING CODE) |
| 0x2103 | NUMBER OF PARAMETERS | FIXED TO 4 IN VER 0.1<br>WILL BE INCREASED WHEN EXTENDED AND CODE 0x2100 IS ADDED |
|  |  |  |

FIG. 7A

| | | |
|---|---|---|
| 0x2104 | USER NAME | FILE NAME GIVEN APPROPRIATELY BY USER |
| 0x2105 | DATE OF REGISTRATION | DATE OF REGISTRATION OF FILE |
| 0x2106 | DATE OF MODIFICATION | DATE OF MODIFICATION OF FILE |
| 0x2107 | NAME OF LINKED ALBUM | NAME OF VIRTUAL ALBUM |
| 0x2108 | LINK ADDRESS | OPTIONAL (ADDRESS INFORMATION SUCH AS SERVER) |
| 0x2200 | NUMBER OF SUB-BLOCKS | 1 WHEN ONLY IMAGE IS STORED WILL BE INCREASED WHEN SOUND AND CHARACTERS ARE ADDED |
| | | |
| 0x2201 | LINK NUMBER | STARTING FROM NO.1 AS DEFINED BY 0x2200 |
| 0x2202 | MANAGEMENT CODE | RESERVED |
| 0x2203 | NUMBER OF PARAMETERS | FIXED TO 1 IN VER 0.1 WILL BE INCREASED WHEN EXTENDED AND CODE 0x2200 IS ADDED |
| 0x2204 | FILE FORMAT | FILE FORMAT CODE |

ELECTRON CAMERA AND METHOD OF CONTROLLING THE SAME

CROSS-REFERENCE TO RELATED APPLICATIONS

This application is based upon and claims the benefit of priority from the prior Japanese Patent Application No. 2000-399296, filed Dec. 27, 2000, the entire contents of which are incorporated herein by reference.

BACKGROUND OF THE INVENTION

This invention relates to an electron camera conforming to the DCF (Design rule for Camera File system) Standard and a method of controlling such an electron camera.

It is well known that the DCF Standard has been provided to define a scheme for managing the files for storing the image data that are obtained as a result of imaging operations using an electron camera on a recording medium. The DCF Standard elaborately defines file names to be used when recording data, directory names and storage areas for storing files and other matters to be observed.

The file management scheme conforming to the DCF Standard is highly convenient for managing data groups to be recorded from the viewpoint of electron camera. However, from the viewpoint of user, the user is not allowed to select a name he or she likes for each of the recorded data groups nor for the directory that is essential for managing the data groups. In other words, the DCF Standard is not very convenient to the user.

The storage capacity of the recording medium connected to an electron camera conforming to the DCF Standards is ever increasing and will be enormous when the time comes for the electron camera to use the hard disk of a PC server as recording medium as a result of technological development in the field of wireless data transmission.

Under these circumstances, it will be highly detrimental to the convenience of user in terms of file management that the user is not allowed to select a name he or she likes put on a file or a directory.

Techniques for managing files for an electron camera are proposed in Jpn. Pat. Appln. KOKAI Publication Nos. 10-177646 and 2000-165789.

Of the above identified patent documents, the former describes a system for managing files storing image data of an electron camera that is adapted to generate a file name specific to each file that is not duplicative with the name of any other file as long as the same camera is used so that there may not exist two or more than two files with a same name, whereas the latter described a technique of taking in video data obtained by operating digital cameras of different types and storing them on files in a simple way. However, neither of them describe about tackling the above identified problems of selecting a name the user likes for a file in a file management scheme conforming to the DCF Standard.

BRIEF SUMMARY OF THE INVENTION

In view of the above described circumstances, it is therefore an object of the present invention to provide an electron camera compatible with any known file management schemes conforming to the DCF Standard and adapted to allow the user to select a name he or she likes for a file or a directory and easily take out the a file or a directory carrying the name selected by the user when storing the image data obtained as a result of imaging operations using the electron camera in order to improve the convenience to the user in terms of file management. Another object of the invention is to provide a method of controlling such a camera.

According to the invention, the above objects are achieved by providing an electron camera adapted to record the image data obtained as a result of imaging operations thereof on a recording medium with a file management scheme conforming to the DCF Standard, the electron camera comprising:

an input section for selecting and inputting a virtual directory name not restricted by the DCF Standard for the directory of the image data recorded on a recording medium with a file management scheme conforming to the DCF Standard;

a recording section for preparing a virtual directory management file showing the correspondence of the virtual directory name selected and input by the input section and the directory name of the same directory conforming to the DCF Standard and recording it on the recording medium, using the virtual directory name as name to be used for recording;

a display section for displaying a list of the virtual directory names selected and input by the input section on a display screen in response to an operation of a specific key;

a selecting section for selecting a predetermined virtual directory name from the list of the virtual directory names displayed by the display section; and a control section for recording the image data obtained as a result of an imaging operation in the directory corresponding to the virtual directory name selected by the selecting section and conforming to the DCF Standard.

In another aspect of the invention, there is provided a method of controlling an electron camera adapted to record the image data obtained as a result of imaging operations thereof on a recording medium with a file management scheme conforming to the DCF Standard, the method comprising:

an input step of selecting and inputting a virtual directory name not restricted by the DCF Standard for the directory of the image data recorded on a recording medium with a file management scheme conforming to the DCF Standard;

a recording step of preparing a virtual directory management file showing the correspondence of the virtual directory name selected and input in the input step and the directory name of the same directory conforming to the DCF Standard and recording it on the recording medium, using the virtual directory name as name to be used for recording;

a display step of displaying a list of the virtual directory names selected and input in the input step on a display screen in response to an operation of a specific key;

a selecting step of selecting a predetermined virtual directory name from the list of the virtual directory names displayed in the display step; and a control step of recording the image data obtained as a result of an imaging operation in the directory corresponding to the virtual directory name selected in the selecting step and conforming to the DCF Standard.

With the arrangement and the method as defined above, a list of selected and input virtual directory names is displayed on a display screen in response to an operation of a specific key and a predetermined virtual directory name is selected from the displayed list of the virtual directory names so that the arrangement and the method are made compatible with any known file management schemes conforming to the DCF Standard and adapted to allow the user to select a name he or she likes for a file or a directory and easily take out a file or a directory carrying the name selected by the user when storing the image data obtained as a result of imaging operations in order to improve the convenience to the user in terms of file management.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
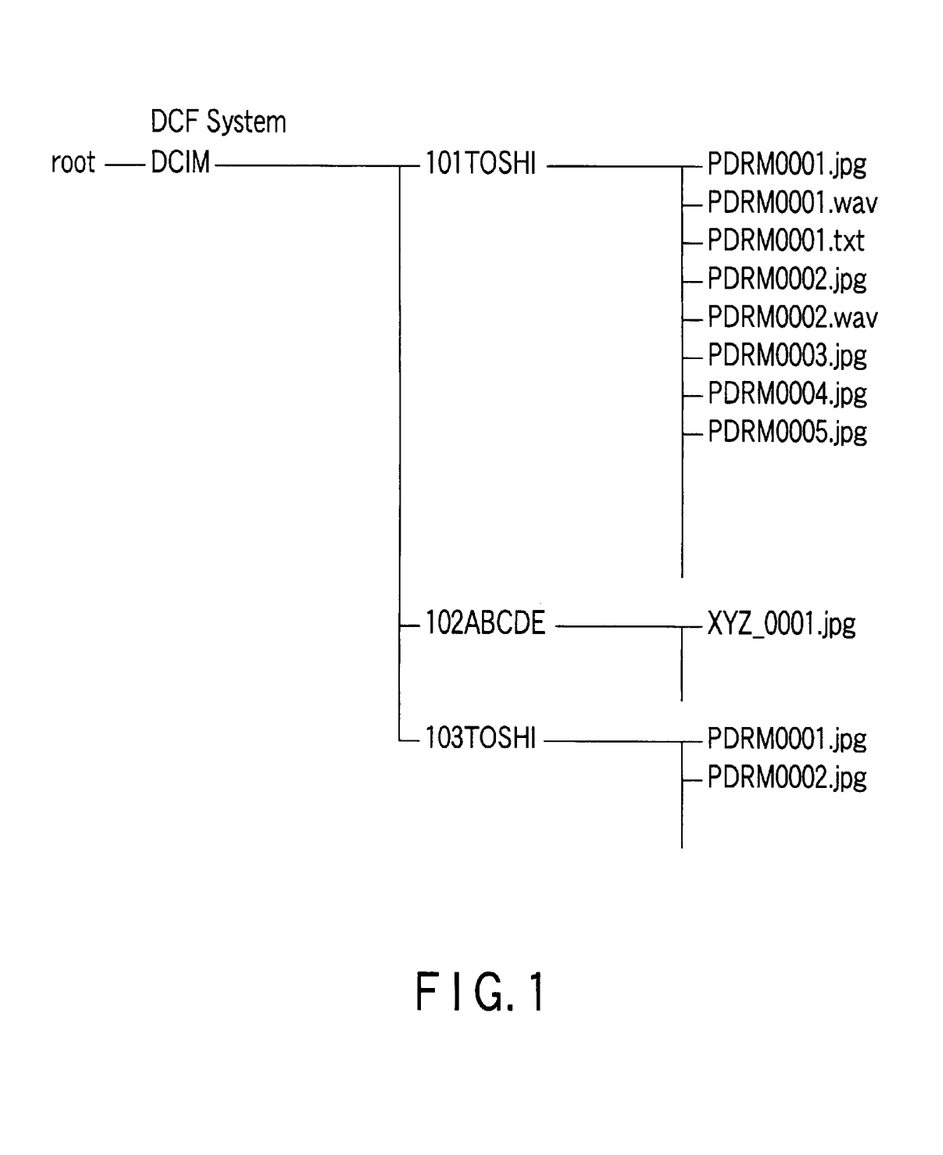
FIG. 1 is a schematic illustration of a file management scheme conforming to the DCF Standard.

Now, the present invention will be described in greater detail by referring to the accompanying drawing that illustrates a preferred embodiment of the invention. FIG. 1 is a schematic illustration of a file management scheme conforming to the DCF Standard. The file management scheme conforms to the provisions of the DCF Standard Ver. 1.0 for camera file systems. Only some of the important provisions of the DCF Standard will be summarily described below.

(1) DCF File Name . . . ####****. $$$

: a string of four characters specific to the vender that are selected from alphanumeric characters and may include one or more than _s

****: file number (a number between 0001 and 9999)

$$$: extender indicating the data format (2) DCF Directory Name . . . ***#####

***: directory number (a number between 100 and 999)

: a string of five characters specific to the vender that are selected from alphanumeric characters and may include one or more than _s (3) DCF Directory A DCIM (DCF Image root directory) carrying a directory name as illustrated in (2) above is prepared and stored with a file name as illustrated in (1) above.

(4) DCF Object

The group of files carrying respective file names whose ####**** are same but different only in terms of extender are treated as a related data group.

(5) Other Provisions

So long as the requirements of the provisions (1) through (4) are met, it is possible to produce a related data group by using a new extender. For example, it is possible to provide a group of data including PDRM0001. TXT, PDRM0001. THM and PDRM0001. WAV for a still image data of PDRM0001. JPG.

The data that are different from each other only in terms of extender are collectively treated as a single group of data and, if the reproducing device is compatible with the above standard, the data can be displayed on a display screen and the text data (Extender TXT), the thumbnail data (Extender THM) and the sound data (Extender WAV) can be reproduced.

While electron camera manufacturers are authorized to handle such data in a manner specific to each camera manufacturer, it is compulsory to them that all the cameras provided by them can reproduce still images. If a data is compatible with a camera adapted to reproduce still images by means of an extender, the camera may have a feature of being able to reproduce other data but such a feature is not compulsory.

Figure 2:
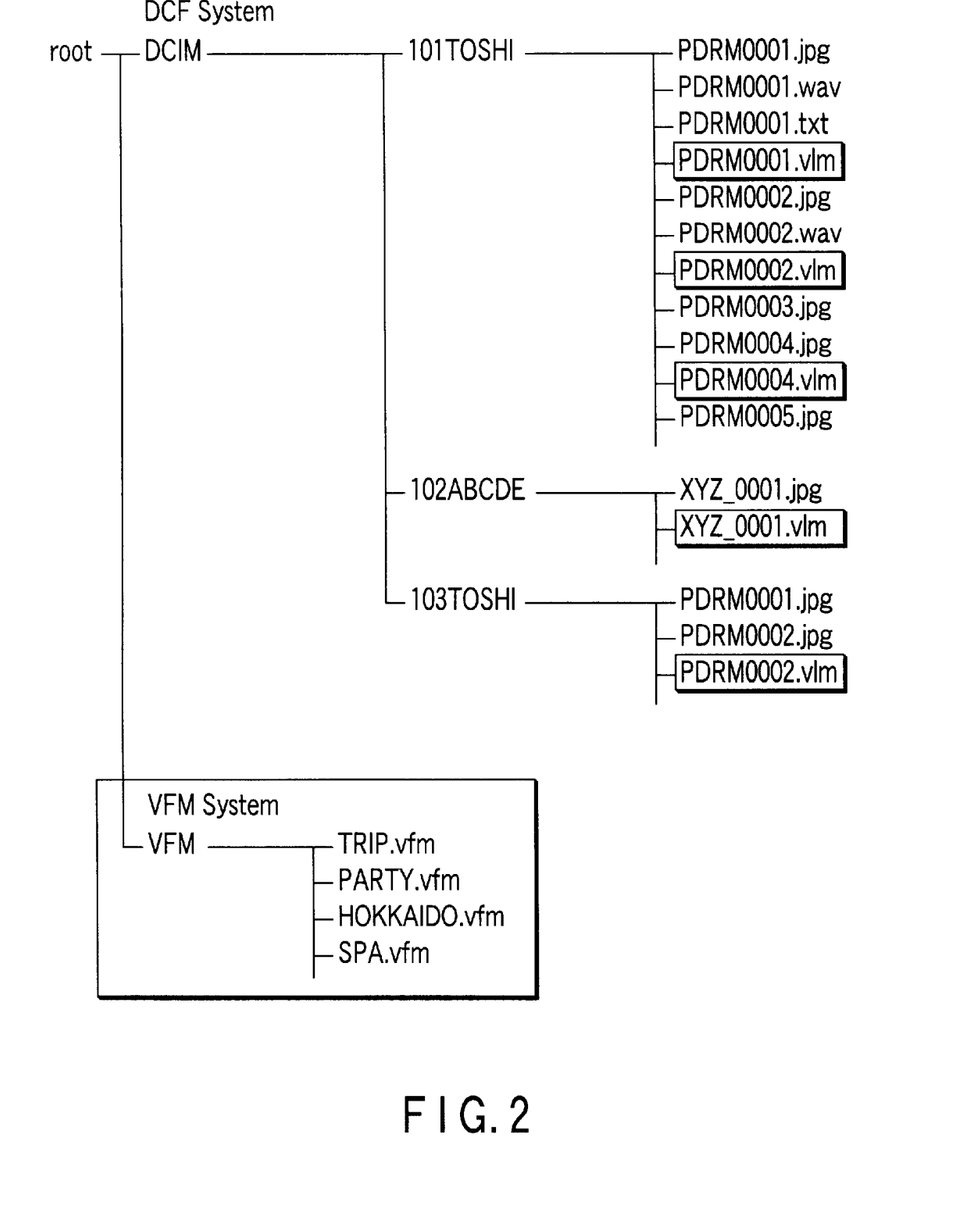
FIG. 2 is a schematic illustration of an embodiment of electron camera and method of controlling the same according to the invention, showing a file management scheme that can be used therewith.

With the above described file management scheme, a new management file as shown in the rectangular frame of FIG. 2 may be added. As a matter of fact, two different types of management files are available. One is a type of virtual directory management files having Extender vfm and the other is a type of virtual file management files having Extender vlm.

Management files having Extender vfm are independent of the DCF Standard and adapted to define a virtual directory. Then, they define information to be referred to a real file that is found within a file management scheme conforming to the DCF Standard by means of a file found in the virtual directory.

On the other hand, management files having Extender vlm conform to the DCF Standard. A management file having Extender vlm is to be provided with a file name that the user likes and is handled as a group of data related to other files having file names that are same as the file name of its own except Extender vlm. The management file having Extender vlm defines the name virtually given to the file by the user.

Figure 3:
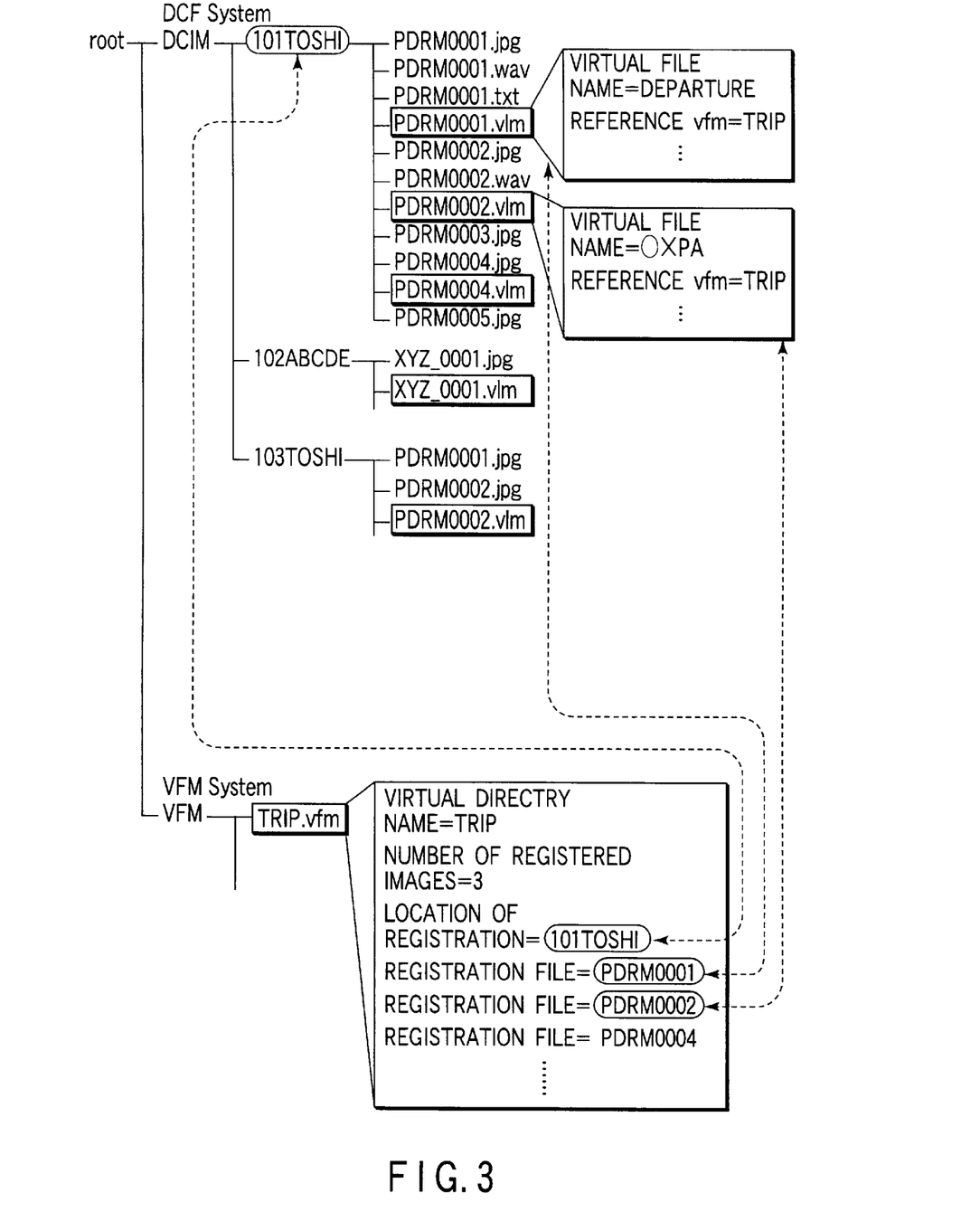
FIG. 3 is a schematic illustration of the relationship between a management file having Extender vfm and a management file having Extender vlm in the embodiment of FIG. 2.

FIG. 3 is a schematic illustration of the relationship between a management file having Extender vfm and a management file having Extender vlm in the embodiment of FIG. 2. Referring to FIG. 3, the file referred to as "trip. vfm" is a management file that defines a virtual directory.

The management file "trip. vfm" describes the virtual directory name ("trip" in this instance), the number of registered images, the directory indicating the locations where actual data are registered (including "101TOSHI" in this instance), the actual file names registered in the directory (including "PDRM0001", "PDRM0002" and "PDRM0004" in this instance) and so on. The actual data stored in the file management scheme conforming to the DCF Standard are detected on the basis of the information in the management file.

Then, the detected directory ("101TOSHI" in this instance) is then retrieved and, if a management file having Extender vlm is found there, the file is analyzed.

For example, the file "PDRM0001. vlm" in FIG. 3 is a management file that defines virtual file names. The management file describes virtual file names (including "departure" in this instance), management file names (including "trip" in this instance) having Extender vfm that refer to the management file and so on.

It is possible to form a virtual directory carrying a name that the user likes and a group of virtual files contained therein and carrying respective names that the user likes.

Since the locations of the actual files corresponding to the virtual file names are described in the management file having Extender vfm, when an actual data is read out from the recording medium, it is detected from the file management scheme conforming to the DCF Standard on the basis of the information on the management file having Extender vfm.

In this way, with this file management scheme, the two types of management files including the type of management files having Extender vfm and that of management files having Extender vlm are handled in a manner consistent with the file management scheme conforming to the DCF Standard to make it possible for the user to select any file names and directory names he or she likes, while maintaining the compatibility of this file management scheme and the file management scheme conforming to the DCF Standard.

The reason why the virtual management files provided for the user to put a name he or she likes are sorted into those having Extender vfm and those Extender vlm and each of the management files having Extender vlm is treated as component of the related data group of the file management scheme conforming to the DCF Standard is that, with such an arrangement, any of them can be erased with the related data group collectively.

If, for example, there is a request for erasing file "PDRM0001", it is possible to erase file "PDRM0001. vlm" collectively with files "PDRM0001. jpg", "PDRM0001. wav" and "PDRM0001. txt". Furthermore, since the management file having Extender vfm is not erased and remains, it is possible to retrieve any of the other files described in the management file and left unerased, including file "PDRM0002" and file "PDRM0004".

With the above described file management scheme, it is possible for the user to acquire an environment where the user can put any name he or she likes to the data to be stored on the recording medium having the file management scheme that conforms to the DCF Standard. In other words, the group of data carrying a name that the user likes can be managed and handled by interpreting the management file having Extender vfm and Extender vlm, so that an album of images picked up by an electron camera conforming to the DCF Standard can be managed appropriately and conveniently.

If an electron camera conforming to the DCF Standard has character data in the form of a 2-byte code, names using the Japanese language including kanjis can be selected to make the file management more effective to Japanese users.

Figure 4:
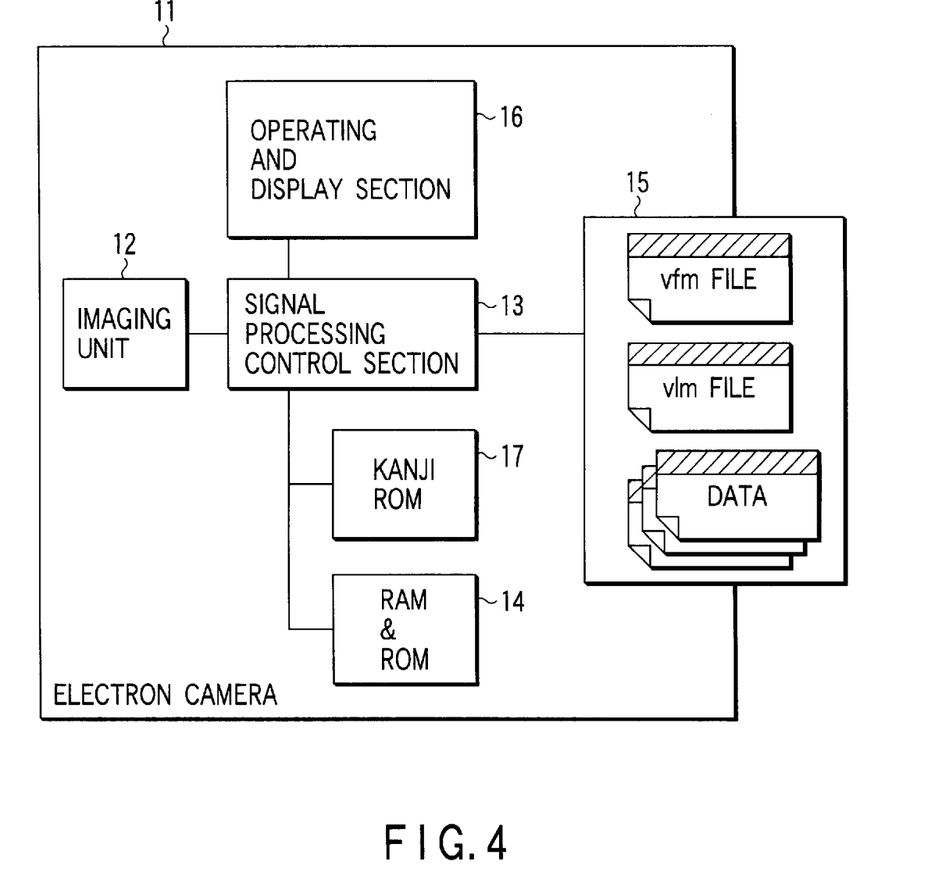
FIG. 4 is a schematic block diagram of the electron camera of FIG. 2, illustrating the signal processing system of the electron camera in detail.

FIG. 4 is a schematic block diagram of the electron camera 11 of FIG. 2, illustrating the signal processing system of the electron camera in detail. Referring to FIG. 4, the electron camera 11 comprises an imaging unit 12 that is adapted to transforms the optical image picked up by the electron camera into an electric image signal. The image signal output from the imaging unit 12 is then fed to a signal processing control section 13 that contains a CPU (central processing unit).

The signal processing control section 13 performs a predetermined signal processing operation on the input image signal, utilizing the recording area thereof and the programs stored in a RAM (random access memory) and ROM (read only memory) section 14 and then stores it on a recording medium 15 removably fitted to the electron camera 11, using a file management scheme conforming to the DCF Standard.

The signal processing control section 13 has a functional feature of writing the file name appropriately selected and input by the user by way of an operating and display section 16 on the recording medium 15 for a file having Extender vfm and a corresponding file having Extender vlm.

The two files including one having Extender vfm and one having Extender vlm and carrying the file name written on the recording medium 15 are then read out from the recording medium and analyzed by the CPU of the signal processing control section 13. Note that the management file having Extender vfm contains the virtual directory name corresponding to the album, whereas the data registered in the album are also registered in the management file having Extender vlm as virtual file.

If 2-byte characters are used for the name of the virtual file and that of the virtual directory, the signal processing control section 13 reads out the corresponding character codes from kanji ROM 17 and cause the operating and display section 16 to display the file name and the directory name along with the image data.

With the above described file management scheme, a group of new management files are introduced, while maintaining the compatibility with the file management scheme conforming to the DCF Standard, and virtual file names and virtual directory names are used for the group of management files.

The group of management files include at least a file and each of the files comprises a directory carrying a virtual name that the user likes, information on the actual locations of the group of data contained in the virtual directory and information on the names selected appropriately by the user.

With the above described file management scheme, it is possible to obtain the information on the relationship between the virtual files and the virtual directories carrying the respective names selected appropriately by the user and the real files and the real directories that are actually found in the file management scheme conforming to the DCF Standard and correspond respectively to the virtual files and the virtual directories by analyzing the group of management files and the virtual files can be managed on the basis of the names put to them appropriately by the user while the real files of the electron camera 11 can be managed on the basis of the names conforming the DCF Standard.

Figure 5:
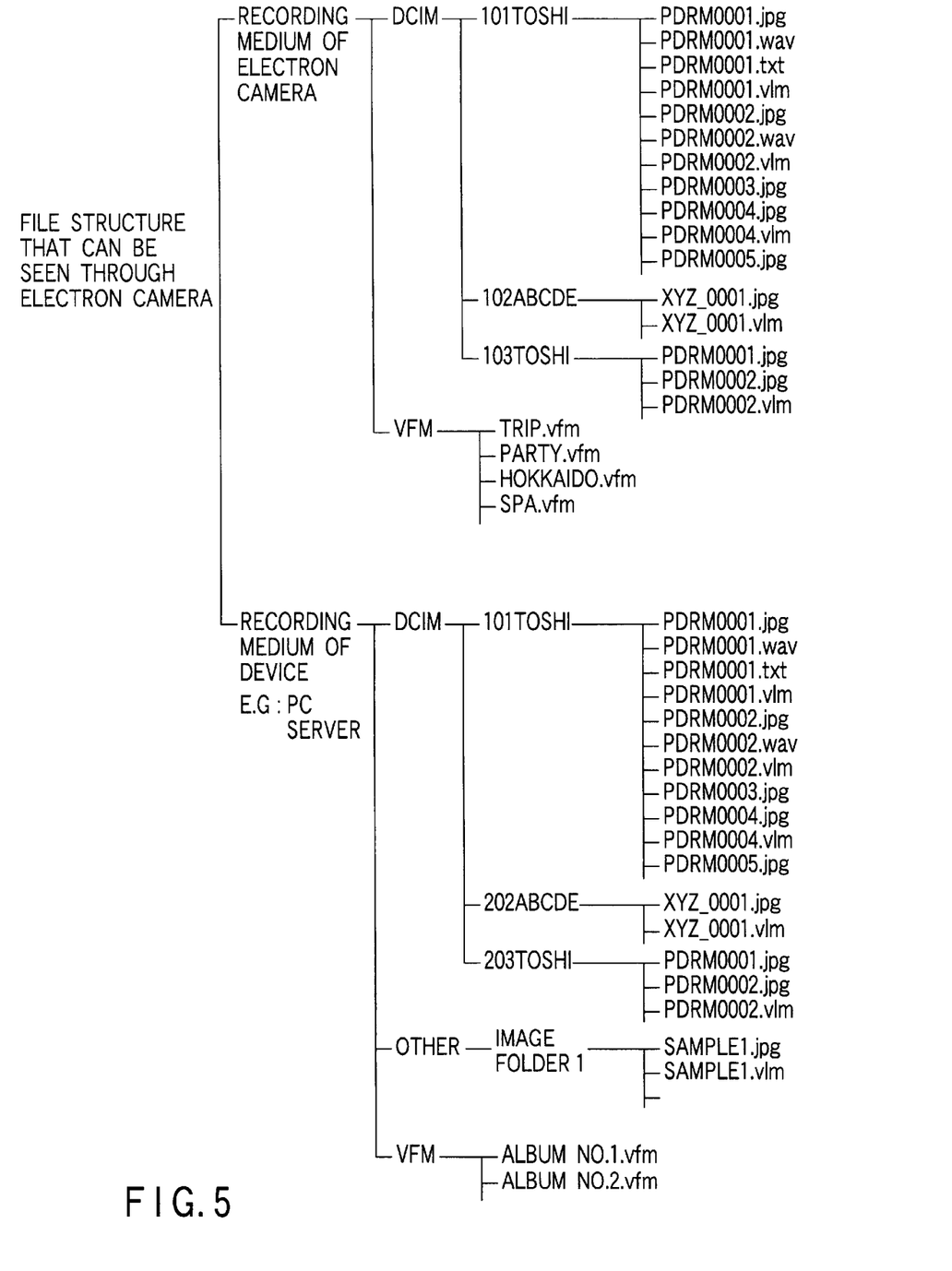
FIG. 5 is a schematic illustration of another file management scheme that can be used with the embodiment of FIG. 2.

FIG. 5 is a schematic illustration of another file management scheme that can be used with the embodiment of FIG. 2. With this file management scheme, management files having Extender vfm and those having Extender vlm can be recorded not only on the recording medium 15 of an electron camera 11 conforming to the DCF Standard but also on the recording medium of each of a number of various devices conforming to the DCF Standard (only a PC server is shown in FIG. 5) and connected to each other wirelessly or by way of wires so as to exchange data.

Then, each of the devices conforming to the DCF Standard is adapted to operate for referring to a management file having Extender vfm and located in the recording medium of some other device, analyzing it and detecting the data it requires at a location where it is actually found on the basis of the information obtained as a result of the analysis.

If the detected data is found in a management file having Extender vlm, the device conforming to the DCF Standard refers to and analyzes the management file so as to detect the name appropriately selected by the user and put to the corresponding management file having Extender vfm.

Figure 6A:
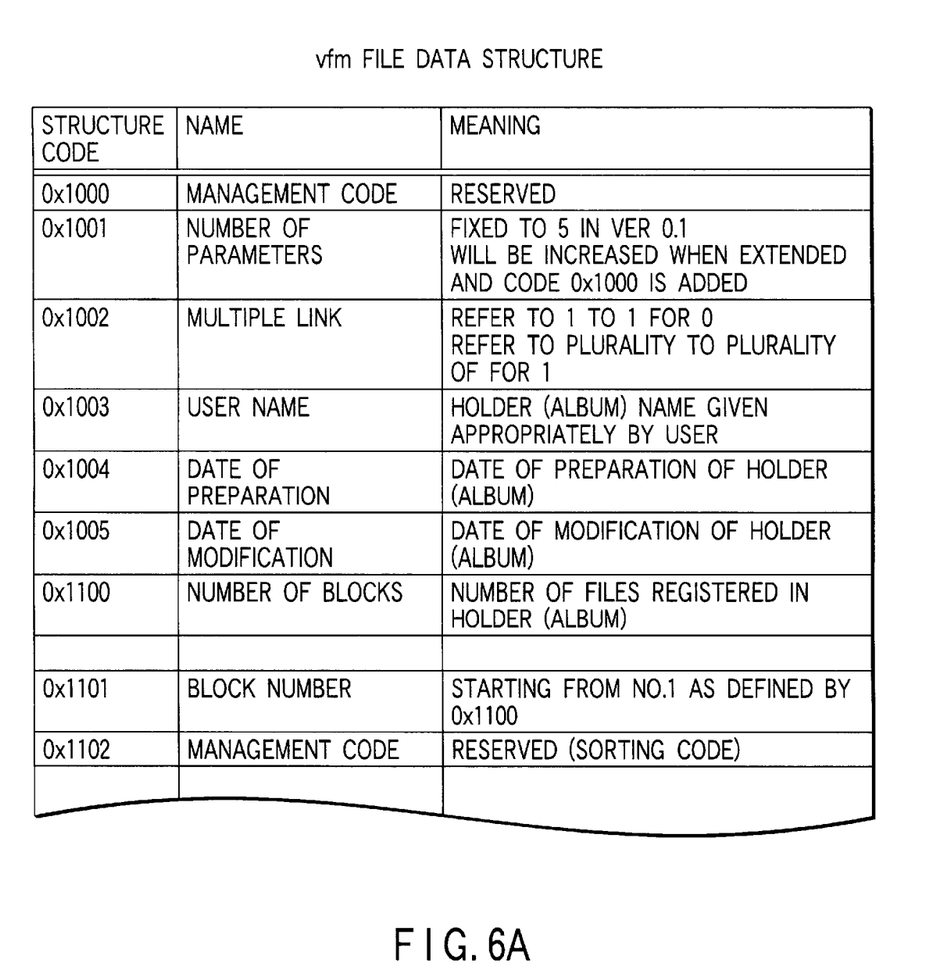
FIGS. 6A and 6B are schematic illustrations of the data structure of a management file having Extender vfm of the embodiment of FIG. 2.
Figure 6B:
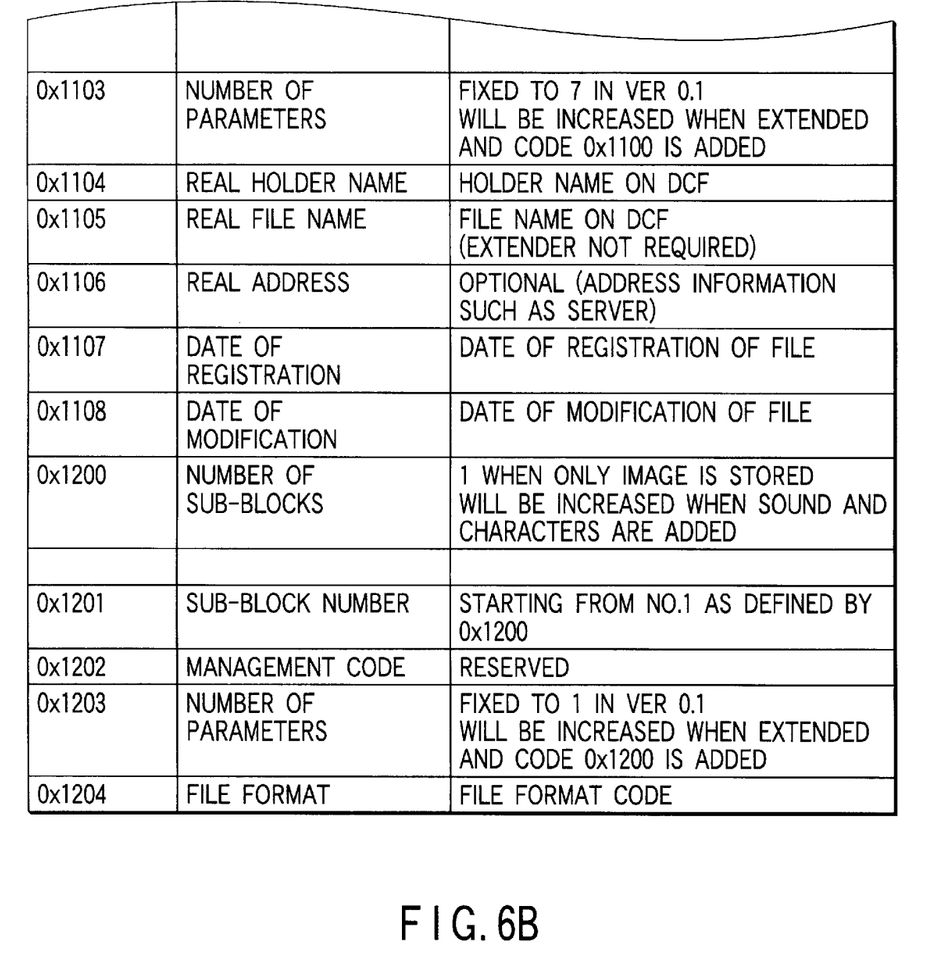
Figure 7A:
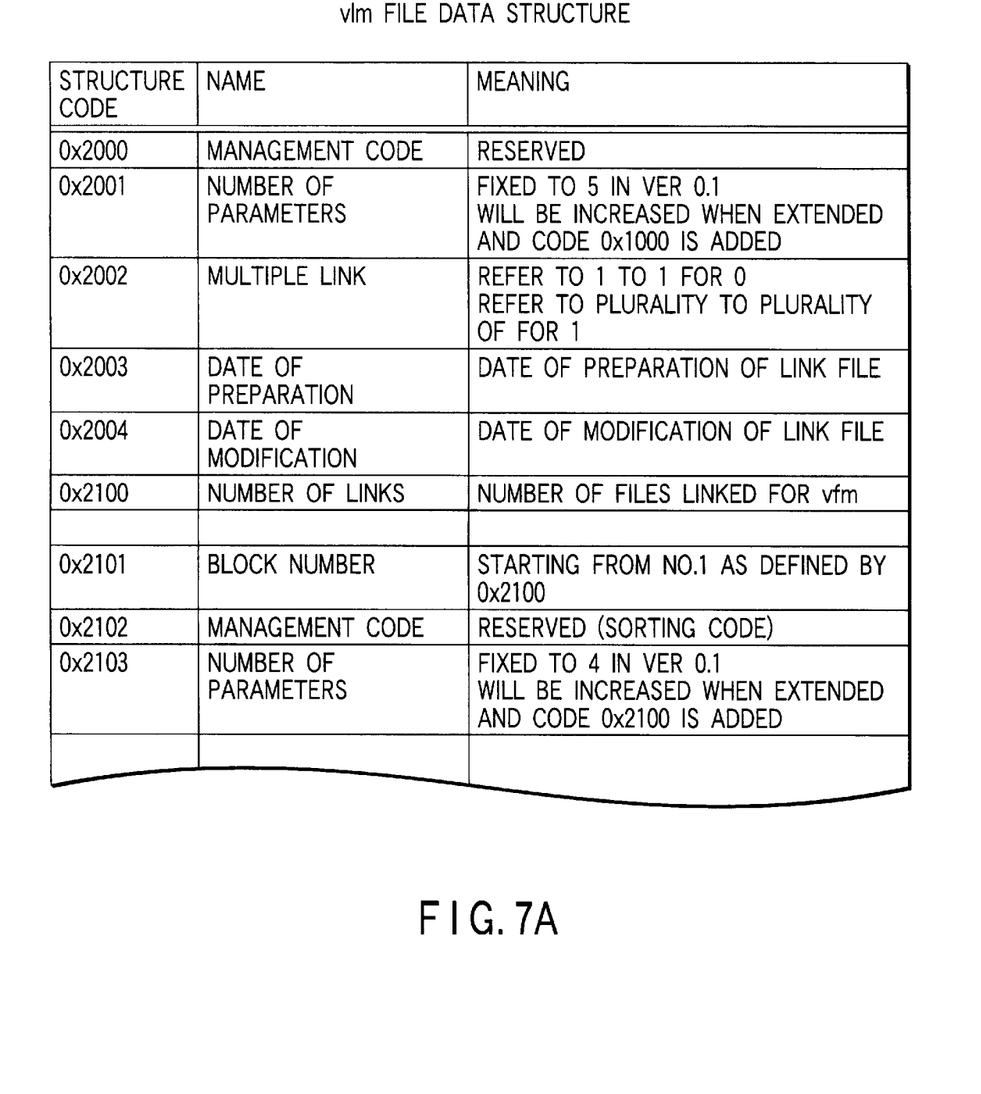
FIGS. 7A and 7B are schematic illustrations of the data structure of a management file having Extender vlm of the embodiment of FIG. 2.
Figure 7B:
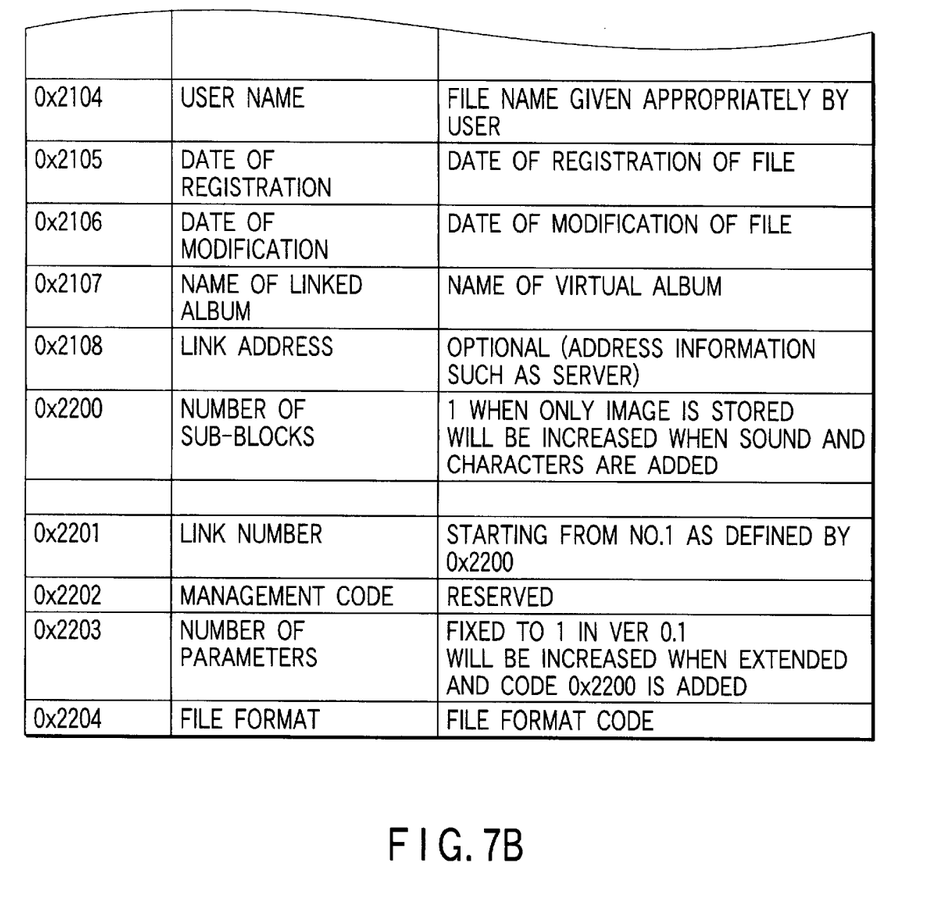

FIGS. 6A and 6B are schematic illustrations of the data structure of a management file having Extender vfm of the embodiment of FIG. 2, whereas FIGS. 7A and 7B are schematic illustrations of the data structure of a management file having Extender vlm of the embodiment of FIG. 2.

As described above, a management file having Extender vfm describes information on the location where the real data is found for each of the registered data ("structure code: 0x1106: real address" in this instance) in order to manage the data found on the recording medium of each of a plurality of devices conforming to the DCF Standard.

On the other hand, a management file having Extender vlm describes the information on the location where the management file having Extender vfm and being referred to ("structure code: 0x2106: link address" in this instance) presuming that it is referred to by a plurality of management file having Extender vfm. Therefore, it is possible to centrally manage the data found on the recording media of a plurality of devices by means of a plurality of virtual directory on the basis of the described information.

Referring to FIGS. 6A and 6B and FIGS. 7A and 7B, the multiple link of each management file having Extender vfm or Extender vlm is equal to "0" when handling the recording media of devices conforming to the DCF Standard and hence found in a closed environment, whereas it is equal to "1" when handling also the recording media of devices that are found in an open environment. In other words, they are used as flags indicating the scope of applicability of the management system using Extender vfm and Extender vlm.

As shown in FIG. 5, it is possible not only to make a management system using Extender vfm and Extender vlm consistent with a file management scheme conforming to the DCF Standard but also to realize it on a file system such as that of an existing PC.

Meanwhile, according to the current DCF Standard, it is possible to record image of a total of 8,999,100 still images by using directory numbers 100 through 999 and file numbers 0001 through 9999. Since the DCF Standard does not provide any identifier for identifying the drive for recording data on and reproducing data from a recording medium, theoretically it should be permitted to record image data on more than one recording media.

However, since the recording medium mounted on any currently available electron camera has only a memory capacity of tens of several megabytes (MBs) probably with few exceptions, there does not occur any situation where image data of 9 million still images at a time.

On the other hand, when there arises a situation where the recording medium of a PC server is connected to an electron camera by way of a radio communication path for data transmission as described above, there may be a case where image data of about 9 million still images have to be managed at a time. Under such circumstances, it is no longer possible for the user to manage data simply by using seven digits numbers obtained by combining 3-digit directory numbers and 4-digit file numbers.

The file management scheme illustrated in FIG. 5 can be used to provide a system that allows the user not only to manage directories and files having respectively names selected appropriately by the user by introducing management files having Extender vfm and those having Extender vlm but also to refer to data stored in more than two recording media including the data exchange medium and/or the recording medium mounted on an electron camera and the recording medium of a PC server and centrally manage them.

In other words, the file management scheme of FIG. 2 is designed to deal with the recording medium of an electron camera and hence the data to be handled are found in the recording medium. On the other hand, the file management scheme of FIG. 5 is designed to deal with a situation where actual data to be handled may also be found in a PC server connected to an electron camera by way of a radio communication path and it is possible to use all the data on the electron camera.

Therefore, with the file management scheme of FIG. 5, the management file having Extender vfm is adapted to hold information on the locations of actual data so that the data found on more than two recording media can be centrally managed by a means of single file (vfm file).

Figure 8:
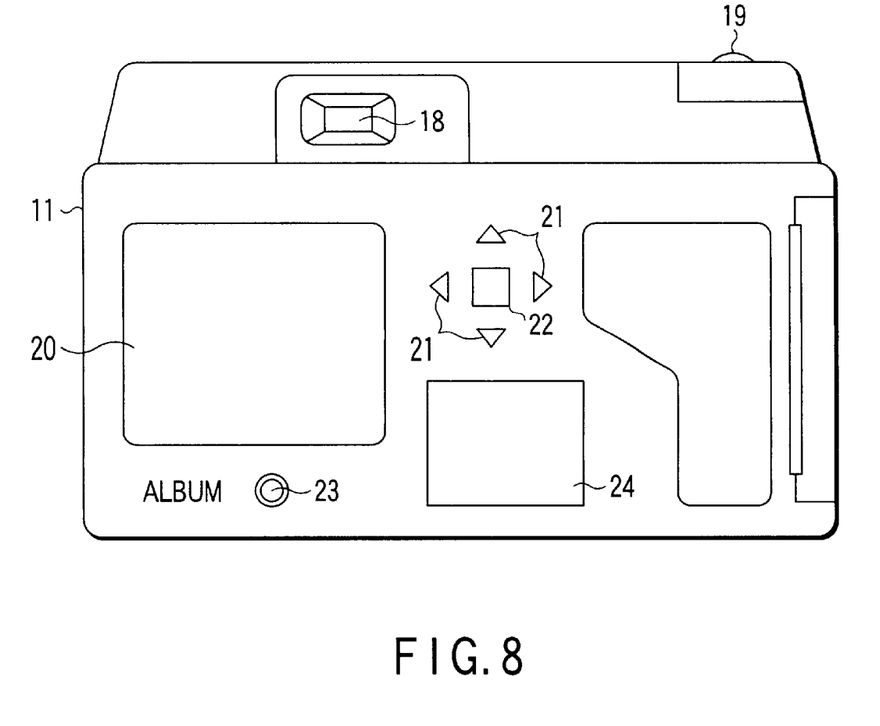
FIG. 8 is a schematic rear view of the electron camera of FIG. 2 or 5.

FIG. 8 is a schematic rear view of the electron camera adapted to manage data using a file management scheme illustrated in FIG. 2 or 5. Referring to FIG. 8, the electron camera 11 is provided with a liquid display section 20 that operates as operating and display section 16 and an operating section 24 having movement keys 21 for moving horizontally and vertically the selection indicator indicating one of the plurality of objects being displayed on the display screen of the liquid display section 20, a determination key 22 for determining the object to be selected by the movement keys 21, an album key 23 and other keys in addition to a finder 18 and a release switch 19.

Figure 9:
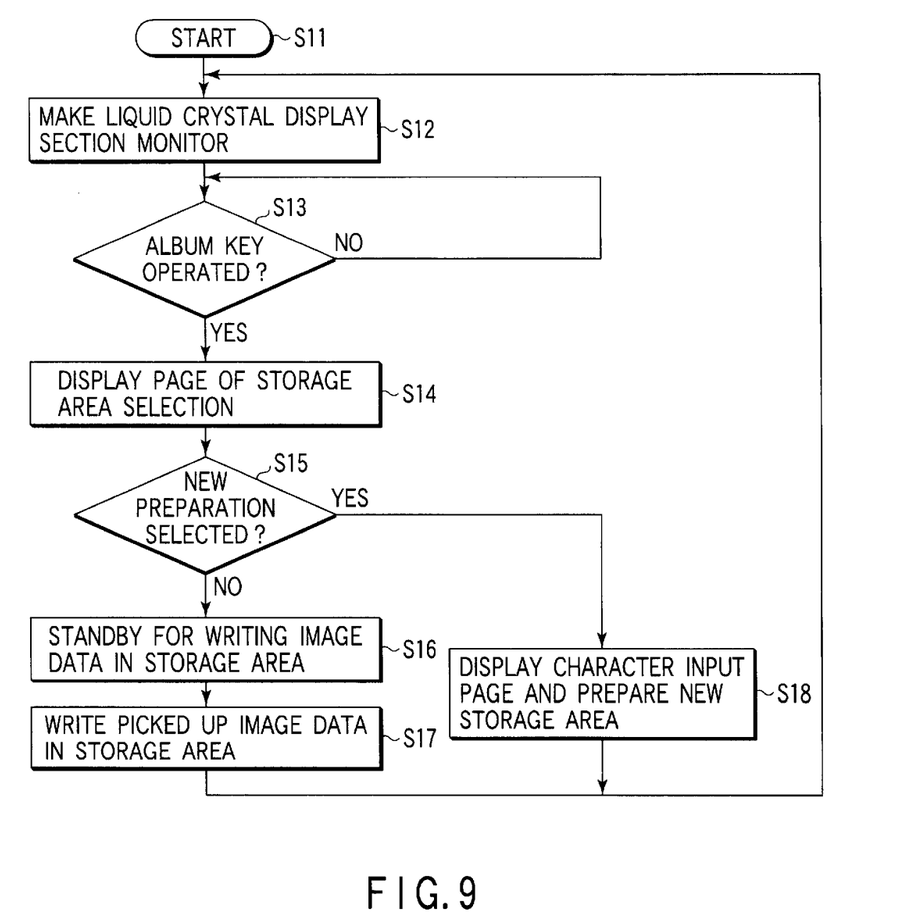
FIG. 9 is a flow chart of the imaging operation of the electron camera of FIG. 2.

FIG. 9 is a flow chart of the imaging operation of the electron camera 11 of FIG. 2. As the user turns on the power supply key in the operating section 24 to make the camera starts operating (Step S11), the signal processing control section 13 controls the liquid crystal display section 20 in Step S12 so as to make it monitor the optical image picked up by the imaging unit 12.

Under this condition, the signal processing control section 13 determines in Step S13 if the album key 23 is operated or not. If it is determined that the album key 23 is operated (YES), the signal processing control section 13 proceeds to Step S14, where it controls the liquid crystal display section 20 so as to make it display the storage area selection menu for selecting the storage area for storing the image to be obtained by the coming imaging operation on the display screen of the liquid crystal display section 20.

Figure 10:
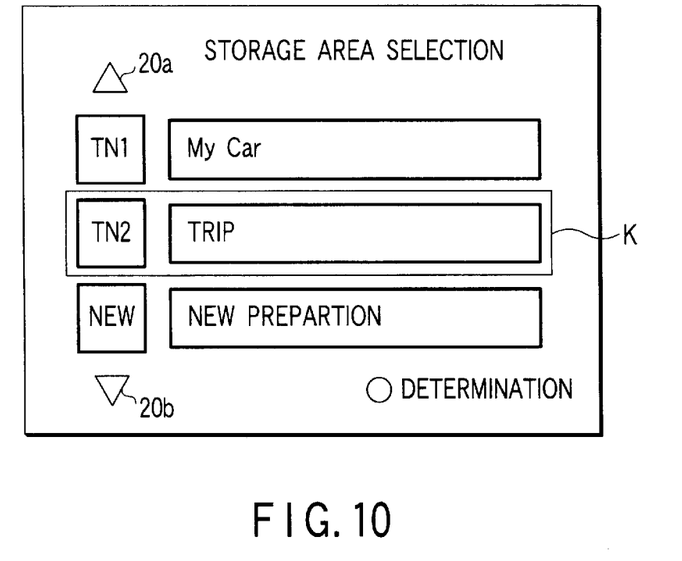
FIG. 10 is an image of the screen that can be used when selecting the files for storing the image data obtained by imaging operations of the electron camera of FIG. 2.

The storage area selection menu in FIG. 10 shows a vertically arranged list of the file names and the directory names given appropriately by the user and stored ("My Car", "Trip") and the corresponding thumbnail images (TN1, TN2) that are the representative images selected in advance by the user from the files and the directories carrying the respective names.

The storage area selection menu additionally includes an item of "new preparation" to be used for preparing a new file and a new directory to be used for storing images with respective new names. The characters of "NEW" are displayed at the corresponding position to be used for displaying a thumbnail image on the line of "new preparation".

One of the storage areas being displayed in the storage area selection menu is surrounded by a rectangular indicator K. As the upper and/or lower movement key 21 is operated, the position of the indicator K is shifted vertically so that the desired storage area can be selected and specified by operating the determination key 22 when it is surrounded by the indicator K.

When the storage area selection menu shows upper and/or lower triangle 20a, 20b on the display screen, they indicate that more storage areas are hidden above and/or below, whichever appropriate because the display screen is full. Then, the storage areas hidden above or below the display screen can be made visible by moving the indicator K to the top or the bottom and then further shift the indicator K upward or downward, whichever appropriate.

Then, in Step S15, the signal processing control section 13 determines if "new preparation" is selected as storage area or not. This judgment is made depending if "new preparation" or one of the storage areas already carrying the names appropriately given by the user is selected in the storage are selection area menu.

If it is determined in Step S15 that "new preparation" is not selected (NO), the signal processing control section 13 proceeds to Step S16, where the electron camera is held to a standby state for writing image data in the selected storage area and, when the expected imaging operation is over, the obtained image data are stored in the selected storage area and the signal processing control section 13 returns to Step S12.

If, on the other hand, it is determined in Step S15 that "new preparation" is selected to prepare a new storage area (YES), the signal processing control section 13 proceeds to Step S18, where it makes the liquid crystal display section 20 display a page to be used for a character input operation of preparing a file and a directory carrying the names appropriately given by the user.

Figure 11:
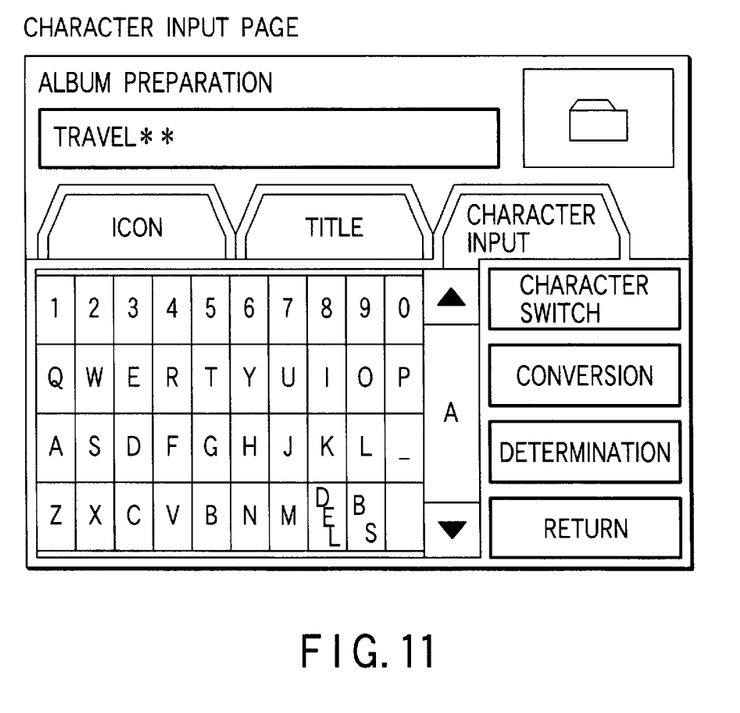
FIG. 11 is a page to be displayed on the display screen for an operation of inputting character data when preparing a new file for storing image data obtained by the electron camera of FIG. 2.

The page to be used for a character input operation carries a list of alphanumeric characters as shown in FIG. 11 so that the user can show a name he or she likes by operating the movement keys 21 and the determination key 22 and using the alphanumeric characters of the list and prepare a new storage area.

With the above described arrangement, the storage areas available to the user of an electron camera are displayed on the display screen of the camera simply by operating the album key 23 so that the user can selects any storage area carrying the name appropriately given by him or her therefrom for storing the image data to be obtained by the coming imaging operation. Then, the user can store the newly picked up image in a desired storage area to improve the convenience of managing the files storing image data for the user, so that any stored image may be retrieved very conveniently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electron camera adapted to record the image data obtained as a result of imaging operations thereof on a recording medium with a file management scheme conforming to the DCF Standard, said electron camera comprising:

an input means for selecting and inputting a virtual directory name not restricted by the DCF Standard for the directory of the image data recorded on a recording medium with a file management scheme conforming to the DCF Standard;

a recording means for preparing a virtual directory management file showing the correspondence of the virtual directory name selected and input by the input means and the directory name of the same directory conforming to the DCF Standard and recording it on the recording medium, using the virtual directory name as name to be used for recording;

a display means for displaying a list of the virtual directory names selected and input by the input means on a display screen in response to an operation of a specific key;

a selection means for selecting a predetermined virtual directory name from the list of the virtual directory names displayed by the display means; and a control means for recording the image data obtained as a result of an imaging operation in the directory corresponding to the virtual directory name selected by the selection means and conforming to the DCF Standard.

2. The electron camera according to claim 1, wherein said selection means includes:

first keys for moving an indicator for selectively indicating one of said plurality of virtual directory names shown in the list displayed by said display means; and a second key for determining the virtual directory name as selectively indicated by the indicator moved by the first keys.

3. The electron camera according to claim 1, wherein said display means is adapted to display the virtual directory name selectively input by said input means and a thumbnail image generated from the image data recorded in the directory corresponding to the virtual directory name and conforming to the DCF Standard in correspondence to each other.

4. The electron camera according to claim 1, wherein said display means is adapted to display items any of which can be selected by said selection means in order to input a newly given name not restricted by the DCF Standard by way of said input means in addition to the virtual directory names selected and input by said input means.

5. An electron camera adapted to record the image data obtained as a result of imaging operations thereof on a recording medium with a file management scheme conforming to the DCF Standard, said electron camera comprising:

an input section for selecting and inputting a virtual directory name not restricted by the DCF Standard for the directory of the image data recorded on a recording medium with a file management scheme conforming to the DCF Standard;

a recording section for preparing a virtual directory management file showing the correspondence of the virtual directory name selected and input by the input section and the directory name of the same directory conforming to the DCF Standard and recording it on the recording medium, using the virtual directory name as name to be used for recording;

a display section for displaying a list of the virtual directory names selected and input by the input section on a display screen in response to an operation of a specific key;

a selecting section for selecting a predetermined virtual directory name from the list of the virtual directory names displayed by the display section; and a control section for recording the image data obtained as a result of an imaging operation in the directory corresponding to the virtual directory name selected by the selecting section and conforming to the DCF Standard.

6. The electron camera according to claim 5, wherein said selecting section includes:

first keys for moving an indicator for selectively indicating one of said plurality of virtual directory names shown in the list displayed by said display means; and a second key for determining the virtual directory name as selectively indicated by the indicator moved by the first keys.

7. The electron camera according to claim 5, wherein said display section is adapted to display the virtual directory name selectively input by said input section and a thumbnail image generated from the image data recorded in the directory corresponding to the virtual directory name and conforming to the DCF Standard in correspondence to each other.

8. The electron camera according to claim 5, wherein said display section is adapted to display items any of which can be selected by said selecting section in order to input a newly given name not restricted by the DCF Standard by way of said input section in addition to the virtual directory names selected and input by said input section.

9. A method of controlling an electron camera adapted to record the image data obtained as a result of imaging operations thereof on a recording medium with a file management scheme conforming to the DCF Standard, said method comprising:

an input step of selecting and inputting a virtual directory name not restricted by the DCF Standard for the directory of the image data recorded on a recording medium with a file management scheme conforming to the DCF Standard;

a recording step of preparing a virtual directory management file showing the correspondence of the virtual directory name selected and input in the input step and the directory name of the same directory conforming to the DCF Standard and recording it on the recording medium, using the virtual directory name as name to be used for recording;

a display step of displaying a list of the virtual directory names selected and input in the input step on a display screen in response to an operation of a specific key;

a selecting step of selecting a predetermined virtual directory name from the list of the virtual directory names displayed in the display step; and a control step of recording the image data obtained as a result of an imaging operation in the directory corresponding to the virtual directory name selected in the selecting step and conforming to the DCF Standard.

10. The method of controlling an electron camera according to claim 9, wherein said selection step includes:

a step of moving an indicator for selectively indicating one of said plurality of virtual directory names shown in the list displayed by said display means by operating first keys; and a step of determining the virtual directory name as selectively indicated by the indicator moved by the first keys by means of a second key.

11. The method of controlling an electron camera according to claim 9, wherein said display step is adapted to display on a display screen the virtual directory name selectively input in said input step and a thumbnail image generated from the image data recorded in the directory corresponding to the virtual directory name and conforming to the DCF Standard in correspondence to each other.

12. The method of controlling an electron camera according to claim 9, wherein said display step is adapted to display items any of which can be selected in said selection step in order to input a newly given name not restricted by the DCF Standard in said input step in addition to the virtual directory names selected and input in said input step.

* * * * *